H. H. WELCH.
ELECTRIC RECORDER.
APPLICATION FILED OCT. 12, 1918.
1,338,715.
Patented May 4, 1920.
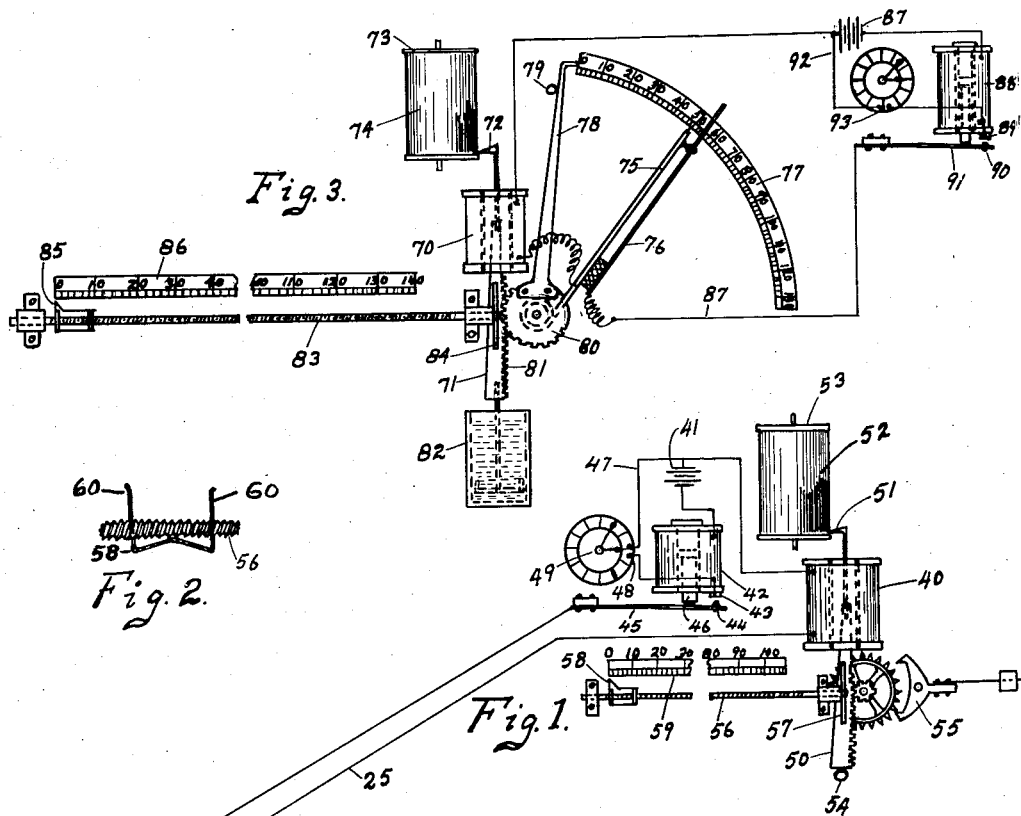
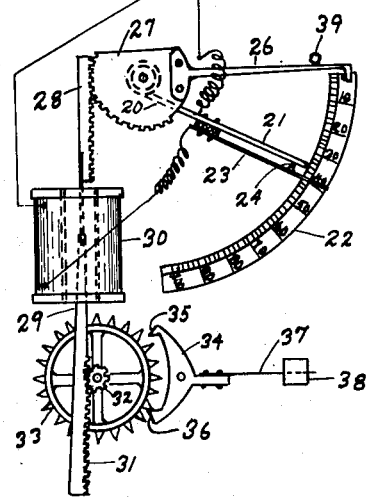
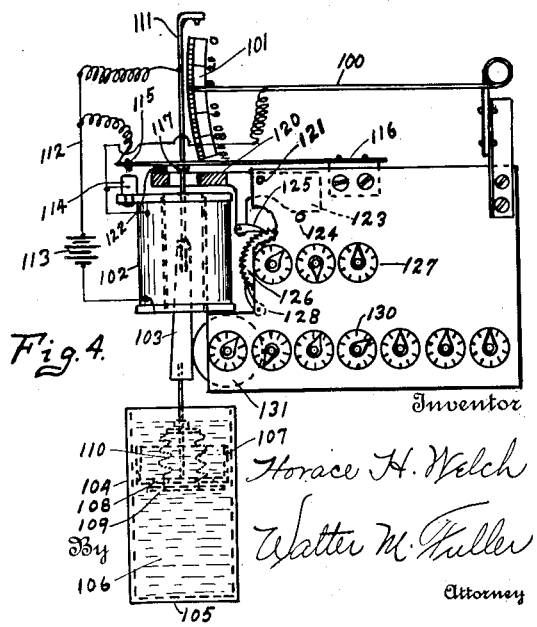
Inventor
Horace H. Welch
By Walter M. Fuller
Attorney
Witness
M. M. Krienand

UNITED STATES PATENT OFFICE.

HORACE H. WELCH, OF CHICAGO, ILLINOIS.

ELECTRIC RECORDER.

1,338,715.  Specification of Letters Patent.  Patented May 4, 1920.

Application filed October 12, 1918. Serial No. 257,858.

*To all whom it may concern:*

Be it known that I, HORACE H. WELCH, a citizen of the United States, residing at Chicago, in the county of Cook and State of Illinois, have invented certain new and useful Improvements in Electric Recorders, of which the following is a specification.

My present invention concerns improvements in electric registering or recording appliances, such, for example, as may be employed in determining temperatures, pressures, and other variable factors and registering or recording the same. A salient feature or leading object of such invention is the provision of an apparatus or system of this general type characterized by its simplicity in structure and mode of operation, its certainty and effectiveness in producing accurate and reliable results, its economy in manufacture, operation, and maintenance, its capability of actuation by a direct continuous, as contrasted with an intermittent, electric current, the employment of a magnetically-controlled actuating means for the recorder, and the use of a timing or retarding appliance associated with the core of the solenoid operating such recorder. In the preferred embodiment of the invention the measuring appliance is located at one station and the recording device positioned at another remote one, suitably connected by an electric circuit, the two instruments being operated magnetically and caused to act synchronously by means of attuned mechanical timing mechanisms.

Various other advantages both from the viewpoints of construction and operation will appear to those skilled in this art from a consideration of the several embodiments of the invention set forth in detail by the description below, and illustrated fully in the accompanying drawings forming a part of this specification, and throughout the various views of which like reference characters refer to the same parts.

In these drawings:

Figure 1 illustrates a preferred and desirable embodiment of the system comprising two stations, one at which the determination or measuring of the variable condition occurs, such as temperature, the other the point of recording or registering the variations in such condition;

Fig. 2 is a section through the index and its threaded nut of the integrating recorder;

Fig. 3 shows a modified structure concentrated at a single station; and

Fig. 4 illustrates another embodiment of the invention employing no clock mechanism and suitable for use for long periods of time without attention to determine a mean or average temperature or other variable condition over such long period.

Referring first to the species of the invention disclosed in Fig. 1, wherein the electric recorder or register may be some distance from the location of the fluctuating or varying condition to be measured or ascertained and registered, it will be observed that at the one station there is a bimetal or other suitable thermometer 20 of known and usual construction having an index arm 21 adapted under variations in temperature to traverse a fixed, graduated, arcuate thermometer scale 22. Obviously, instead of a thermometer, any other measuring or indicating instrument or element might be employed, provided it has some form of movable member whose position varies proportionately to the variations of a changing condition or quality, such as heat, pressure, liquid-level, and so forth. This movable arm 21 constitutes one contact of an electric-switch of which the companion conducting element is a spring 23 insulatingly mounted on the arm and carrying a contact 24 normally engaging the arm under the action of its spring and thus at this point closing an electric circuit 25, terminals of which are as shown connected to the two parts of the switch. As is clearly indicated, spring arm 23 is of such length as to extend beyond the thermometer index arm 21 by means of which projection the switch can be readily opened and the electric circuit broken. Such operation of the switch is accomplished by a bent arm 26 fixedly mounted on a rotatably-supported gear-sector 27 concentric to the arcuate scale 22, the sector and right-angle arm being actuated by a rack 28 on the upper end of a vertically-disposed, tapered core 29 of a solenoid 30, the wire coil of which is included in the electric circuit 25.

In order to time, retard, restrain, govern, or control the upward travel of the core and its rack when under the influence of the energized solenoid, an escapement mechanism is provided comprising rack-teeth 31 on the lower portion of the straight side or edge of the core in mesh with a pinion 32 fixed to a rotatably-mounted escapement-wheel 33 associated with an oscillatory anchor 34 having the usual opposed pallets or locking-detents 35 and 36. This escapement-mechanism is restricted or confined to a natural definite speed of operation by means of an outstanding flat spring 37 secured to the anchor and fitted with a weight 38 which unitedly determine the period of oscillation of the anchor and detents and hence the speed of actuation or release of the escape-wheel. This period or frequency of vibration or oscillation may be varied by modifying the amount of the weight or by shifting its position on the spring.

The descent of the core and the upward swinging of arm 26 are limited by an abutment or stop pin 39 against which the arm is adapted to strike when at its upward limit of travel.

The apparatus at the other, or registering or recording, station, comprises a vertically-arranged solenoid 40, an electric battery 41, a second, upright solenoid 42, and an electric-switch 43, 44 all in the circuit 25, contact 44 being on an upwardly-acting leaf-spring 45 normally held depressed away from its companion contact 43 by reason of core 46 of solenoid 42 resting thereon and consequently imposing its weight on the spring. Shunted around the battery and the coil of solenoid 42 is a subsidiary electric circuit 47 containing an electric-switch 48 adapted to be automatically momentarily closed at definite time intervals by a clock 49 in any well known way. In the preferred embodiment this clock closes the circuit one thousand times in twenty-four hours, but, of course, this may be varied to suit the existing conditions.

The vertical, tapered core 50 of solenoid 40 carries a marker 51 at its top end coöperating with a sheet of paper 52 on a cylinder or drum 53 rotated slowly by mechanism not shown. Thus the marker makes a series of parallel upright lines representing the lengths of the periods of closure of the electric circuit containing the solenoid, or, in other words, the strokes of the core carrying the marker. A stop or abutment 54 below the core limits the descent of the latter and the speed of upward travel of the core under the influence of the solenoid is determined by an escapement-mechanism 55, a duplicate of that for core 29, whereby the two cores will rise at the same speed or in synchronism and, because their solenoids are in the same circuit, for the same length of time. Hence marker 51 in effect registers the movements of the core 29 at the other station.

Sheet 52 will record the individual thermometer readings, the upper ends of the parallel lines traced thereon visually representing the fluctuations in such readings. In order to integrate these readings another portion of the mechanism is provided comprising a suitably-journaled, horizontal, screw-threaded shaft 56 equipped at one end with a soft iron cylindrical disk or roller 57 bearing against or closely adjacent to core 50. When the solenoid is energized and the core is being drawn upwardly, the disk or roller will be attracted into contact therewith sufficiently, due to the magnetic pull or action of the core thereon, so that the disk and its shaft will be rotated. When the solenoid is deënergized, however, and the core descends under its own weight, the disk and shaft will not be turned because of the absence of the magnetic attraction of the core for the disk. Consequently, shaft 56 will be turned in one direction only corresponding in amount and direction to the upward strokes only of the core. Such shaft has a nut index or pointer 58, illustrated in detail in Fig. 2, coacting with a suitably-graduated scale 59. The nut is of clip form and by pressing its two ends, 60, 60, toward one another, it may be temporarily released from the thread of the screw and slid back to zero position. Obviously any other desirable form of nut and index may be employed in its place.

The appliance operates substantially as follows. All magnets are normally deënergized by reason of the open switch 43, 44 in the circuit 25 and the open switch 48 in the subsidiary or auxiliary circuit 47. At predetermined, equal, time intervals, desirably of 86.4 seconds, the clock momentarily closes the switch 48 thereby energizing magnet 42 which sucks or draws up its core permitting the closing of switch 43, 44, thus completing the circuit 25 containing the three magnets 42, 40 and 30. Switch 43, 44 now no longer depends upon the closure of switch 48 for its being maintained closed, but rather is now controlled solely by switch 21, 24, and switch 48 may open without deënergizing solenoid 42.

Immediately upon the closing of switch 43, 44, as explained, both magnets 30, 40 are simultaneously rendered active and their cores ascend at equal speeds by reason of their timing devices or escapements being tuned to the same periodicity or frequency. The rise of core 29, by means of the rack 28 and sector 27, carries arm 26 away from its limiting stop 39 and gradually moves it toward arm 23, and, when it reaches and engages the latter, it automatically opens switch 21, 24, thus breaking circuit 25 and deënergizing all of the three solenoids at the same moment. During the ascent of core 40, marker 51 traced the then prevailing temperature affecting thermometer 20 on the paper sheet and that amount was also integrated or added to the sum of previous readings by the movement of index 58 relative to scale 59. Immediately upon the deenergizing of the magnets both cores 29 and 50 descend gradually by their own weights, being restrained or retarded equally or synchronously in this movement by their respective escapement-mechanisms. In this way, arm 26 is carried back to its normal position against stop or abutment 39 which stop not only limits its movement but also the descent of the core. Core 50 returns to stop 54 carrying the marker down to zero or normal position but not operating the integrating index 58. Core 46 drops onto the spring 45 opening swith 43, 44. When the clock again closes the switch this cycle of operations is repeated and the individual temperature readings registered and integrated with the other previous readings and the total recorded. At the end of twenty-four hours, that is, after one thousand readings have been taken, the amount indicated on scale 59 should be divided by one thousand to obtain the mean or average reading. Or, if preferred, scale 59 may be so graduated with respect to the number of readings that no division is required.

In those instances where the testing or measuring and registering or recording are to occur or may occur at the same station, the two station devices of Fig. 1 may be consolidated as illustrated in Fig. 3, and in place of an escapement timing or retarding device a dash-pot or other suitable mechanism may be used. This apparatus includes an upright solenoid 70, its tapered vertical core 71, marker 72 carried thereby, the clock-operated drum 73 and the record paper sheet 74 thereon, the metallic thermometer 75 carrying switch-arm 76, a graduated thermometer scale 77, arm 78, stop pin 79, sector 80 on which the right-angle arm 78 is mounted, rack-teeth 81 on the core and with which the sector coacts, dash-pot device 82 connected to and retarding the upward movement of the core, screw shaft 83, soft-iron roller or disk 84 coöperating with the core, nut-index 85, integration scale 86, electric circuit 87 including solenoid 70, switch 75, 76, a battery 87, a solenoid 88, and an electric-switch 89, 90, the solenoid having a core 91 normally maintaining the switch-contacts 89, 90 apart. As in the previous instance the battery 87 and solenoid 88 are shunted by a secondary circuit 92 containing a clock-operated switch 93. The mode of operation of this appliance is very simple and will be readily understood without further description. It will be observed, however, that whereas in the system of Fig. 1 the like and equal time or synchronized movements of cores 29 and 40 is secured by having two escapement-devices tuned or adjusted to the same periodicity or frequency of action, in the appliance of Fig. 3 the movements of the corresponding elements are controlled by a single core and hence must be the same or proportional to one another.

In some cases it may be desired to secure a mean or average temperature value of many readings taken over a long period of time and to meet this need I have provided an appliance which will operate for an extended time, possibly months or years, without attention. Such an apparatus is shown in Fig. 4. It includes a metallic thermometer 100, a graduated temperature scale 101 with which it functions, an upright solenoid 102 provided with a vertical, tapered core 103 coupled at its lower end to a dash-pot structure 104 of ordinary construction permitting the core to rise rapidly, but compelling it to descend relatively slowly. This dash-pot or retarding arrangement may consist of a member 105 containing a liquid 106 and housing a cup-shaped plunger 107 connected to the core and having apertures 108 adapted to be closed during the descent of the core by a flat valve-plate 109 connected to the stem of the plunger by one or more springs 110, whereby when the core rises, the plate, due to the action of the liquid, moves away from the holes and permits free passage of the liquid therethrough, whereas, when the core moves down, the apertures are closed by the plate and the descent of the parts is retarded or slowed.

The upper end of the core has a bent or right-angle arm 111 fixed thereto, the horizontal part of which during its downward travel is adapted to engage and make electrical contact with the thermometer arm 100.

An electrical circuit 112 contains a battery 113 and the coil of the solenoid, the wires thereof being connected as shown to arms 100 and 111. The circuit wire is also connected to a stationary contact 114 and from a point between the battery and arm 111 to a spring contact 115 supported at 116 and ordinarily held away from its companion contact 114 by a nut or collar 117 beneath it on rod 111.

A bell-crank armature 120 pivoted at 121 extends over the upper end of the solenoid and is there apertured for the passage therethrough of rod 111, the armature carrying a block of insulation 122 beneath the spring 115 with which it coöperates. The armature is counterweighted at 123 and its depending arm 124, carrying a pawl 125, coöperates with a ratchet-wheel 126 operatively associated with a train of counter-wheels 127 similar to those of a gas or electric light meter. Obviously every time the magnet is energized the armature is attracted to it and the ratchet and number wheels are stepped around one unit. A restraining or lock-pawl 128 may be used to prevent backward rotation of the ratchet-wheel.

Another set of inter-geared counter or recorder wheels 130 is associated with a cylindrical, soft-iron disk or roller 131 engaging or near to the smooth, straight, side-face of the vertical core 103. When a current of electricity passes through the solenoid the magnetism holds the disk 131 to the core sufficiently whereby its upward travel turns the disk and operates the integrating recorder-wheels 130 an amount proportional to the extent of travel of the core.

The operation of this appliance takes place practically as follows. Assume that the solenoid is deënergized and that the core is slowly descending under its own weight, such movement being retarded by the dash-pot. Both electric switches are open. When arm 111 during such descent touches thermometer arm 100, the position of which is determined solely by the prevailing temperature, the circuit is momentarily closed and the magnet energized. Immediately armature 120 is attracted permitting switch 114, 115 to close (the collar or nut 117 being down out of the way at this time), thus maintaining the further energization of the magnet irrespective of switch 110, 111, such movement of the armature also operating the counter recorder 127 one unit. This energization of the magnet lifts the core rapidly, which range of movement is registered on the integrating recorder 130, until collar or nut 117 opens switch 114, 115 thus cutting off the supply of current to the magnet, switch 100, 111, having been opened as soon as the core started its upward travel. Then the core slowly descends until arm 111 again touches the thermometer arm 100 whereupon the operations specified are repeated. This action continues over an indefinite period without attention, there being no clock mechanism to effect the intermittent closing of the circuit, the same general effect being secured by the employment of the dash-pot device.

Obviously by dividing the sum total of the ranges of movement of the core as registered on the integration meter 130 by the number of times of actuation of the core as recorded on the counter 127, the average value or mean temperature is easily obtained.

If desired, the individual movements of the core may be registered by a marker on a sheet of paper by a mechanism like that illustrated in Fig. 1 and associated with the arm 111 all as will be readily understood.

It is to be understood that this invention is not limited and restricted to the precise and exact details of construction herein presented but rather it is to be appreciated that these may be varied in many ways without departure from the substance of the invention and without the sacrifice of its substantial benefits and advantages.

I claim:

1. In a measuring system of the character described, the combination of means under the influence of a variable condition whose position corresponds at all times to the status of such condition, a movable member, a recorder, electro-magnetic means to move said member at intervals from a normal position to one corresponding to that of said first means and to permit said member to return to normal position and to operate said recorder synchronously with the movement of said member, and means to retard the action of said electro-magnetic means, substantially as described.

2. In a measuring system of the character described, the combination of means under the influence of a variable condition whose position corresponds at all times to the status of such condition, a movable member, a recorder, electro-magnetic means to move said member and to operate said recorder synchronously with the movement of said member, means to send a continuous electric current through said electro-magnetic means at intervals for periods of time corresponding to the then status of said condition, and means to retard the action of said electro-magnetic means, substantially as described.

3. In a measuring system of the character described, the combination of an electric circuit, an electro-magnetic recorder actuated by the current in said circuit, a movable member, electro-magnetic operating means for said member also actuated by the current in said circuit, means operative at intervals to send a continuous electric current through said circuit for periods of time corresponding to the then status of a variable condition, and means to synchronize the actions of said two electro-magnetic means, substantially as described.

4. In a measuring system of the character described, the combination of an electric circuit, an electro-magnetic recorder actuated by the current in said circuit, a movable member, electro-magnetic operating means for said member also actuated by the current in said circuit, means operative at intervals to send a continuous electric current through said circuit for periods of time corresponding to the then status of a variable condition, and means to equally retard the actions of said two electro-magnetic means, substantially as described.

5. In a measuring system of the character described, the combination of an electric circuit, an electro-magnetic recorder actuated by the current in said circuit including an electro-magnet and its core, a movable member, electro-magnetic operating means for said member also actuated by the current in said circuit and including an electro-magnet and its core, means operative at intervals to send a continuous electric current through said circuit for periods of time corresponding to the then status of a variable condition, and escapement mechanisms for said two cores tuned to the same frequency of vibration whereby the actions of said two electro-magnetic means are synchronized, substantially as described.

6. In a measuring system of the character described, the combination of an element whose position corresponds to the varying status of a changeable condition, a movable member, electro-magnetic means including said element to move said member at intervals from a normal position for periods of time corresponding to the then status of said condition and to restore said member to normal position after each actuation thereof, means to retard the action of said electro-magnetic means on said member in at least one direction of its movement, and means to record said periods of time, substantially as described.

7. In a measuring system of the character described, the combination of an element whose position corresponds to the varying status of a changeable condition, a movable member, electro-magnetic means including said element to move said member at intervals at a substantially uniform speed from a normal position, distances corresponding to the then status of said condition and to restore said member to normal position after each actuation thereof, means to retard the action of said electro-magnetic means on said member in at least one direction of its travel, and means to record the ranges of movement of said member, substantially as described.

8. In a measuring system of the character described, the combination of an element whose position corresponds to the varying status of a changeable condition, a movable member, means to move said member at intervals distances corresponding to the then status of said condition including said element, a solenoid, a core acted on by said solenoid, and means to transmit the movements of said core to said member, means to retard the movements of said core, and means to record the movements of said member, substantially as described.

9. In a measuring system of the character described, the combination of an element whose position corresponds to the varying status of a changeable condition, a movable member, means to move said member at intervals distances corresponding to the then status of said condition including said element, a solenoid, a core acted on by said solenoid, and means to transmit the movements of said core to said member, an escapement to retard the movements of said core, and means to record the movements of said member, substantially as described.

10. In a measuring system of the character described, the combination of an electric circuit, an electro-magnetic recorder actuated by the current in said circuit, a movable member, electro-magnetic operating means for said member actuated by the current in said circuit, means to complete the circuit at intervals for periods of time corresponding to the then status of a variable condition, means to retard the action of said recorder, and means to retard the action of said electro-magnetic operating means, substantially as described.

11. In a measuring system of the character described, the combination of an electric circuit, a source of electrical energy in said circuit, means to close said circuit at intervals for periods of time corresponding to the then status of a variable condition, an electric recorder actuated by the current in said circuit, including a solenoid, a movable core, and a disk adjacent to and under the magnetic attraction of said core when the solenoid is energized and revolved by the movement of said core only when the core is magnetized, substantially as described.

12. In a measuring system of the character described, the combination of means under the influence of a variable condition whose position corresponds at all times to the status of such condition, a movable member, a recorder, electro-magnetic means to move said member and to operate said recorder synchronously with the movement of said member, means to send a continuous electric current through said electro-magnetic means at intervals of 86.4 seconds for periods of time to cause said member to move distances corresponding to the then status of said condition, and means to retard the action of said electro-magnetic means, substantially as described.

13. In a measuring system of the character described, the combination of means under the influence of a variable condition whose position corresponds at all times to the status of such condition, a movable member, a recorder, electro-magnetic means to move said member and to operate said recorder synchronously with the movement of said member, and means to send a continuous electric current through said electro-magnetic means at intervals of 86.4 seconds for periods of time to cause said member to move distances corresponding to the then status of said condition, substantially as described.

14. In a measuring system of the character described, the combination of an electro-magnetic integrating recorder, an electric circuit including the coil of said electro-magnet, and means to energize said electro-magnet at equal time intervals by a continuous electric current in said circuit to cause said recorder to operate an amount each time corresponding to the then status of a variable condition, whereby said recorder integrates a plurality of values of said variable condition, substantially as described.

15. In a measuring system of the character described, the combination of an electro-magnetic integrating recorder, an electric circuit including the coil of said electro-magnet, and means to energize said electro-magnet at intervals by a continuous electric current in said circuit causing said recorder to operate an amount each time corresponding to the then status of a variable condition, said recorder having a register calibrated to indicate the mean value of such variable condition at the completion of a predetermined number of actuations thereof, substantially as described.

HORACE H. WELCH.